United States Patent [19]

Widner

[11] Patent Number: 4,473,932

[45] Date of Patent: Oct. 2, 1984

[54] DETONATOR REMOVER

[75] Inventor: Rayburn K. Widner, Arab, Ala.

[73] Assignee: The United States of America as represented by the Secretary of the Army, Washington, D.C.

[21] Appl. No.: 453,040

[22] Filed: Dec. 27, 1982

[51] Int. Cl.³ .............................................. B23P 19/02
[52] U.S. Cl. ................................................... 29/251
[58] Field of Search .......................... 269/47, 285, 274; 29/251, 252, 281.3, 281.1, 283

[56] References Cited

U.S. PATENT DOCUMENTS

| 1,938,375 | 12/1933 | Coffee | 269/47 |
| 4,077,284 | 3/1978 | Twichell | 29/251 |
| 4,118,851 | 10/1978 | De Martelaere | 29/283 |
| 4,254,946 | 3/1981 | Kerr et al. | 269/285 |

Primary Examiner—Robert C. Watson
Attorney, Agent, or Firm—Anthony T. Lane; Robert P. Gibson; James T. Deaton

[57] ABSTRACT

A detonator removing device for removing stab detonators from a holder device and in which the stab detonators have one sensitive surface and other relatively non-sensitive surfaces. The detonator removing device including a base member with a ledge member mounted thereon. The ledge member has securing studs on a top surface thereof for mounting a slide bar relative thereto and a cutout at one end for accommodating removal of a stab detonator in the slide bar. A body member is mounted open the ledge member and has a spring biased pin slidably mounted therein with guide means for guiding the pin. A sponge is provided on the base member to cushion and catch the stab detonator when carefully pressed from the slide bar by the pin. This provides a specialized tool for removing stab detonators which must be handled with care to prevent detonation thereof upon removal.

1 Claim, 4 Drawing Figures

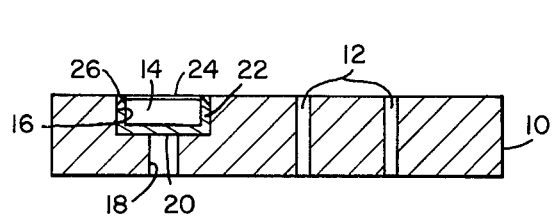
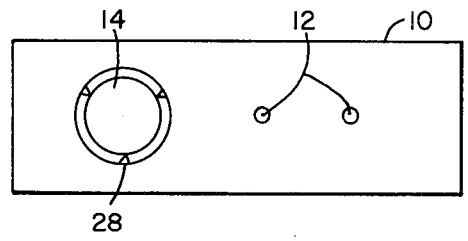
FIG. 1    FIG. 2
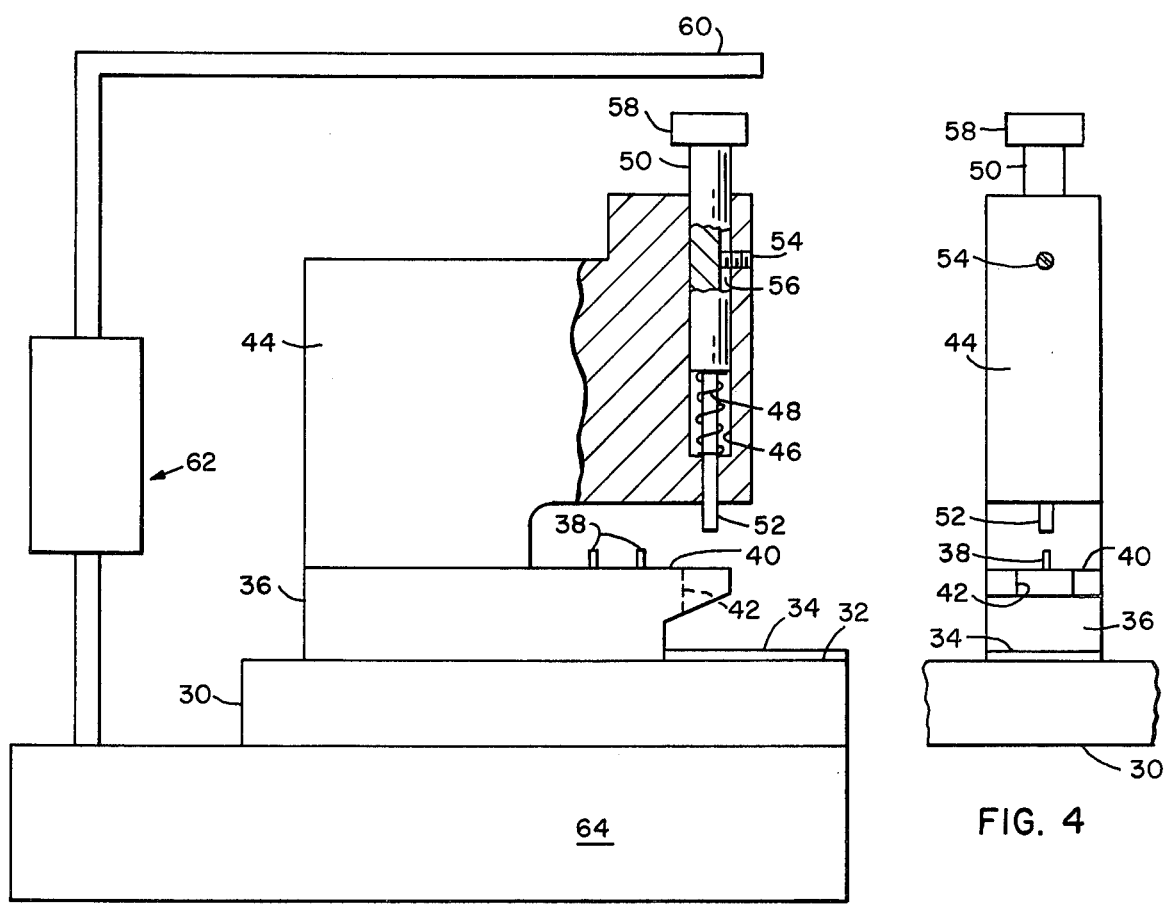
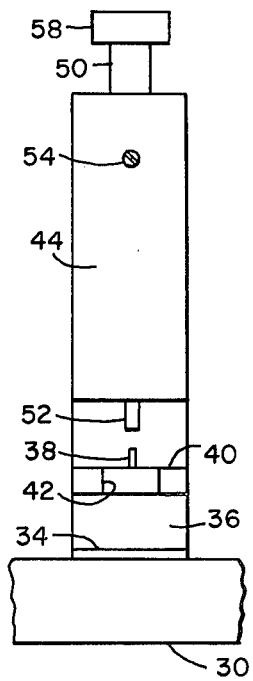
FIG. 3    FIG. 4

DETONATOR REMOVER

BACKGROUND OF THE INVENTION

In the use of stab detonators, it is found that the detonator is not always used in the structure in which it is initially mounted. These stab detonators have one very sensitive surface and another surface that is not as sensitive and can be used to apply force to the stab detonator without setting it off. Therefore, since there is a need for utilization of stab detonators in different structures from which they are mounted, a device is needed for removing stab detonators after they have been installed in a first mounting device.

Therefore, it is an object of this invention to provide a device which enables one to remove stab detonators from the devices in which they are mounted without detonating the stab detonator.

Another object of this invention is to provide a stab detonator removing device in which the mount for the stab detonator can be accurately located on a base and a plunger used to apply force to a non-sensitive area of the stab detonator to force the stab detonator from its mount.

Other objects and advantages of this invention will be obvious to those skilled in this art.

SUMMARY OF THE INVENTION

In accordance with this invention, a detonator removing device is adapted to be mounted between jaws of a press and includes a base with a ledge member with securing means for securing a stub detonator holder thereon and with a cutout at one end for accommondating removal of the stab detonator. Also, above the ledge is mounted a member that has a plunger therein that is spring biased away from the ledge and has a groove in the plunger and a guide mounted in the support for guiding the plunger in its linear motion. A holder device that has a stepped bore therethrough contains a stab detonator that is held therein by having a portion of the detonator holder staked or crimped thereover to hold the stab detonator therein. The holder device has attachment openings therein that are designed to fit over the securing means on the ledge member. A soft material such as sponge rubber is mounted on the base to cushion the fall of the stab detonator thereon when it is removed from its holder.

BRIEF DESCRIPTION OF THE DRAWINGS

FIG. 1 is a sectional view of a stab detonator holder with a stub detonator mounted therein, FIG. 2 is a top view of the detonator holder with the stab detonator mounted therein, FIG. 3 is a side view partially in section of a detonator remover in accordance with this invention, and FIG. 4 is a front view of the detonator remover in accordance with this invention.

DESCRIPTION OF THE PREFERRED EMBODIMENT

Referring now to the drawing, a metal securing means slide bar 10 has a pair of attachment holes 12 therethrough and a stab detonator 14 is mounted in bore 16 of metal slide bar 10. A vent hole 18 is placed in slide bar 10 for venting bore 16 and allowing stab detonator 14 to be mounted with close tolerance in bore 16. Stab detonator 14 has substantial walls 20 and 22 and very sensitive wall surface 24 that is adapted to have a firing pin applied thereagainst to detonate stab detonator charge within stab detonator 14. Stab detonator 14 has wall 22 tapered at 26 and portions 28 of slide bar 10 are staked over tapered surface 26 to hold stab detonator 14 in bore 16 of metal slide bar 10. It has been found necessary to remove stab detonator 14 from metal slide bar 10. Since stab detonators 14 are quite sensitive, special means must be provided to prevent detonation of stab detonators 14 when they are being removed from metal slide bar 10. To accomplish this, a detonator remover as illustrated in FIGS. 3 and 4 is provided and includes a base 30 with an upper surface 32 on which a soft material such as sponge rubber 34 is mounted. Also on upper surface 32 a ledge member 36 is mounted that has attachment studs 38 for mounting metal slide bar 10 with openings 12 over studs 38 and on upper surface 40 of ledge 36. One end of ledge 36 has an arc-shaped portion 42 cutout to accommodate movement and guidance of stab detonator 14 from metal slide bar 10 to soft pad 34. Arc-shaped portion 42 has a diameter slightly larger than the diameter of the stab detonator. Above ledge 36, a body member 44 is mounted and has a stepped bore 46 therethrough with spring 48 and pin 50 mounted in stepped bore 46. Pin 50 has variable diameters as illustrated with smaller diameter end 52 being adapted for insertion through opening 18 in slide bar 10 to press stab detonator 14 from bore 16 when metal slide bar 10 is appropriately attached on surface 40 of ledge 36. Spring 48 biases pin 50 in an upward position and screw 54 is mounted in body member 44 and projects into groove 56 of pin 50 for guiding pin 50. Pin 50 also has an enlarged head 58 that is gently pressed by jaw 60 of press 62 to move pin 50 slowly toward jaw 64 of press 62 to slowly press stab detonator 14 from bore 16.

In operation, when it is desired to remove stab detonators 14 from metal slide bars 10 the desired metal slide bar 10 is mounted on surface 40 of ledge 36. With the detonator remover between jaws 60 and 64 of a conventional press for gently pressing head 58 toward jaw 64, reduced diameter 52 of pin 50 is received through opening 18 in metal slide bar 10 and presses against relatively thick end wall of stab detonator 14 at surface 20 to cause stake portions 28 to be severed and stab detonator 14 to be slowly and gently pressed from bore 16 and finally lodged onto the soft surface of member 34. In removing stab detonators 14 in this manner by pushing with pin 50, and forcing the stab detonator from slide bar 10, the stab detonator is removed without causing detonation of the stab detonator.

I claim:

1. A device for removing a stab detonator from a slide bar comprising, a base having an upper surface with a ledge member mounted on said upper surface with said ledge member having a top surface at one end adapted for mounting the slide bar thereon with the stab detonator positioned over a cylindrical removed section of said ledge member and with said removed section being positioned above the upper top surface of said base member, said ledge having securing studs mounted at said top surface for reception in attachment holes in the slide bar for accurately positioning and securing the slide bar relative to said top surface of said ledge member, and a body member mounted over said ledge member and having a pin slideably mounted therein with said pin being aligned with a hole in the slide bar for allowing said pin to engage a surface of the detonator and with said detonator aligned to drop through said cylindrical removed section of said ledge member, said pin being spring baised in and upward direction away from said ledge member and said pin having guide means for guiding it in linear movement and for preventing said pin from falling out of said body member, means for gently pressing said pin down on the stab detonator to push the stab detonator from its mounting in the slide bar, and resilient means mounted on the top surface of said base member and beneath said cylindrical removed section of said ledge member to resiliently catch the stab detonator when removed from the slide bar to help prevent detonation of the stab detonator on removal.

* * * * *